United States Patent [19]

Oathout

[11] Patent Number: 5,645,916
[45] Date of Patent: Jul. 8, 1997

[54] PATTERNED SPUNLACED FABRICS CONTAINING WOODPULP OR ABACA FIBERS

[75] Inventor: James Marshall Oathout, Mt. Juliet, Tenn.

[73] Assignee: E. I. Du Pont de Nemours and Company, Wilmington, Del.

[21] Appl. No.: 486,445

[22] Filed: Jun. 8, 1995

Related U.S. Application Data

[60] Division of Ser. No. 20,040, Feb. 19, 1993, Pat. No. 5,459,912, which is a continuation-in-part of Ser. No. 857,689, Mar. 31, 1992, abandoned.

[51] Int. Cl.$^6$ .............................. D04H 1/42; D04H 1/46
[52] U.S. Cl. ................. 428/131; 428/132; 428/135; 428/137
[58] Field of Search .................... 428/131, 132, 428/134, 135, 137, 297, 284, 286, 287, 283, 299

[56] References Cited

U.S. PATENT DOCUMENTS

| | | | |
|---|---|---|---|
| 3,485,706 | 12/1969 | Evans | 428/134 |
| 4,931,355 | 6/1990 | Radwanski et al. | 428/283 |
| 5,093,190 | 3/1992 | Kwok et al. | 428/288 |
| 5,320,900 | 6/1994 | Oathout | 428/288 |

*Primary Examiner*—Kathleen Choi

[57] ABSTRACT

Patterned spunlaced fabrics formed of synthetic fibers and woodpulp and/or woodpulp-like fibers are disclosed having very low wet and dry particle counts and good absorbency. The patterned spunlaced fabrics according to the invention are particularly useful as cleanroom wipers, robotic covers, food service wipes, and as coverstock for sanitary napkins, diapers, surgical body part bags, and the like. The invention also comprises a process of making the patterned spunlaced fabrics.

6 Claims, 2 Drawing Sheets

PATTERNED SPUNLACED FABRICS CONTAINING WOODPULP OR ABACA FIBERS

CROSS-REFERENCE TO RELATED APPLICATION

This application is a divisional application of Ser. No. 08/020,040, filed 19 Feb. 1993, which is now a U.S. Pat. No. 5,459,913. Application Ser. No. 08/020,040 is a continuation in part of Ser. No. 07/857,689, filed Mar. 31, 1992, abandoned.

FIELD OF THE INVENTION

The present invention relates to patterned spunlaced fabrics and a process of making the same. More particularly, the invention relates to patterned spunlaced fabrics formed of synthetic fibers and woodpulp and/or woodpulp-like fibers, which fabrics exhibit very low wet and dry particle counts and good absorbency.

BACKGROUND OF THE INVENTION

Fabric wipers used in cleanroom applications require low particle generation when tested in air and water environments. In addition, cleanroom wipers must exhibit adequate absorbency rates and capacities. Unfortunately, particle generation and absorbency properties for many fabrics are many times mutually exclusive of each other. For example, untreated 100% polyester fabrics generate very low wet and dry particle counts but provide almost no absorbency. On the other hand, cotton fabrics or fabrics containing woodpulp exhibit high absorbency rates and capacity but typically generate unacceptably high wet and dry particle counts.

In the past, commercially available non-patterned spunlaced woodpulp/polyester fabrics (55 wt. % woodpulp/45 wt. % polyester) have proved adequate when used in Class 100 cleanroom environments. Federal Standard 209E, Sep. 11, 1992, defines airborne particulate cleanliness classes of air in cleanrooms using both English and metric units, and specifies that Class 100 air shall have no more than 100 particles (0.5 micrometer or larger) per cubic foot, or the equivalent metric designation of no more than 3530 particles (0.5 micrometer or larger) per cubic meter for Class M 3.5 air. Although Class 100 environments may be currently acceptable for non-sensitive operations, it has become increasingly desirable to have even lower particle counts for sensitive high-tech cleanroom applications.

U.S. Pat. No. 3,485,706 (Evans) discloses hydroentangling fibrous webs to produce textile-like patterned nonwoven fabrics. The hydroentanglement process calls for imparting high energy water jets (i.e., usually between about 200 and 2,000 psi) to a fibrous web to entangle the web and produce a spunlaced fabric. In FIG. 40 of Evans, a continuous commercial process is depicted wherein the fabric is subsequently dewatered by one or more squeeze rollers. Unfortunately, the application of high impact energy and squeeze roll dewatering produces fabrics which are typically unacceptable for sensitive high-tech cleanroom wiper applications.

Numerous examples in Evans disclose patterned spunlaced fabrics. Typically, the patterned spunlaced fabrics are fabricated of 100% synthetic textile staple fibers (e.g., polyester). Patterning takes place during hydroentanglement treatment by supporting the fibers on an apertured patterning member and then passing the fibers through a series of water jet banks. In addition, there are a few samples disclosed in Evans which demonstrate the use of relatively short cellulosic fibers in combination with synthetic staple fibers. These samples were made on table washers where the belt speed was very slow. Moreover, some of these samples were formed using predominantly cellulosic fibers (i.e., less than 50 wt. % synthetic fibers).

However, when a continuous commercial process was considered for making patterned spunlaced fabrics formed of synthetic fibers and woodpulp and/or woodpulp-like fibers, the conventional wisdom was that, although webs of 100% synthetic fibers could be successfully hydroentangled and patterned at commercial speeds, webs containing woodpulp and/or woodpulp-like fibers could not be formed on an apertured patterning member without destroying web integrity and/or generating large amounts of wet and dry particles. The wisdom was that supporting a synthetic/woodpulp web on an apertured patterning member would cause the woodpulp fibers to be washed out of the web through the openings in the patterning member when the web was treated with high energy water jets during hydroentanglement. In addition, it was believed that low process speeds (i.e., speeds below about 135 yds/min) would be required in order to overcome the problem of fabric wrinkling caused by excessive water carryover. Therefore, synthetic/woodpulp spunlaced fabrics were not patterned by high speed commercial hydroentanglement processes for fear that the web would lose its integrity during hydroentanglement treatment and/or that the fabric would exhibit numerous post-treatment wrinkles due to water carryover.

Due to the problems inherent in the prior art, the applicant recognized the need for a spunlaced fabric which provides an adequate degree of absorbency yet very low wet and dry particle counts. In this regard, the applicant has surprisingly found that patterned spunlaced fabrics formed of synthetic fibers and woodpulp and/or woodpulp-like fibers provide low wet and dry particle counts yet good absorbency when processed under certain conditions. These conditions allow such patterned spunlaced fabrics to be made at commercial speeds without woodpulp washout or fabric wrinkling. Other objects and advantages of the present invention will become apparent to those skilled in the art upon reference to the attached drawings and to the detailed description of the invention which hereinafter follows.

SUMMARY OF THE INVENTION

In accordance with the invention, there are provided patterned spunlaced fabrics formed of synthetic fibers and woodpulp and/or woodpulp-like fibers having very low wet and dry particle counts and good absorbency.

The patterned spunlaced fabrics of the invention comprise 5–50 wt. % woodpulp fibers, woodpulp-like fibers, or combinations thereof and 50–95 wt. % synthetic fibers. Preferably, the synthetic fibers are textile staple fibers or spunbonded fibers made of polyester. However, the synthetic fibers may also be made of polypropylene, polyamide, polyacrylonitrile resins, or combinations thereof. The inventive spunlaced fabrics contain a pattern on predominantly one surface of the fabric and exhibit a dry particle count no greater than 8000 particles/ft$^3$, a wet particle count no greater than $6.5 \times 10^7$ particles/m$^2$, an absorbency rate of at least 0.10 g/g/sec and an absorbency capacity of at least 300%. The patterned spunlaced fabrics of the invention are extremely well-suited for sensitive high-tech wiper applications.

In a more preferred embodiment, the inventive patterned spunlaced fabrics have a dry particle count no greater than 5000 particles/ft$^3$, a wet particle count no greater than 5.0×10$^7$ particles/m$^2$, an absorbency rate of at least 0.15 g/g/sec and an absorbency capacity of at least 350%.

The invention also provides a process for making absorbent, low-linting, patterned spunlaced fabrics formed from a web of synthetic fibers and woodpulp and/or woodpulp-like fibers. Preferably, the initial web comprises a layer of synthetic fibers and a layer of woodpulp and/or woodpulp-like fibers such that the web has a predominantly woodpulp side and a predominantly synthetic fiber side. (Composite structures are also possible wherein the woodpulp and/or woodpulp-like fibers are sandwiched between synthetic fiber layers.) The process comprises, as a first step, supporting the synthetic fiber side of the web on a smooth foraminous screen. Thereafter, the unsupported side of the web is traversed by high velocity jets of water providing a total impact energy of at least 2× Hp-hr-lb$_f$/lb$_m$ for this process step to entangle the fibers of the woodpulp layer with the fibers of the synthetic layer. Thereafter, the hydroentangled web, preferably the woodpulp side of the web, is supported on an apertured patterning member having from about 40 to about 10 openings per inch. Then, the unsupported side of the web, preferably the synthetic side of the web, is traversed by high velocity jets of water providing a total impact energy for this process step of at least 2× HD-hr-lb$_f$/lb$_m$ to move the fibers laterally and vertically from their original positions toward the apertures of the patterning member to form a spaced apart pattern on the surface of the supported side of the fabric. The pattern is determined by the pattern of openings in the apertured patterning member.

To the applicant's surprise, patterning a hydroentangled web of synthetic fibers and woodpulp and/or woodpulp-like fibers on an apertured patterning member does not cause the woodpulp fibers to be washed out of the web during subsequent hydroentanglement treatment, but rather that patterning drastically decreases the amount of wet and dry particles present in the final spunlaced fabric. As a result, patterning is a critical element in producing spunlaced fabrics of synthetic fibers and woodpulp and/or woodpulp-like fibers that will satisfy the requirements necessary for sensitive high-tech cleanroom applications.

Patterned spunlaced fabrics of the invention are useful as cleanroom wipers, robotic covers, food service wipers, coverstock for sanitary napkins, diapers, surgical body part bags, and other end-use applications where low-linting and absorbency properties are important.

BRIEF DESCRIPTION OF THE DRAWINGS

The invention will be better understood with reference to the following figures.

DETAILED DESCRIPTION OF THE PREFERRED EMBODIMENTS

Figure 1:
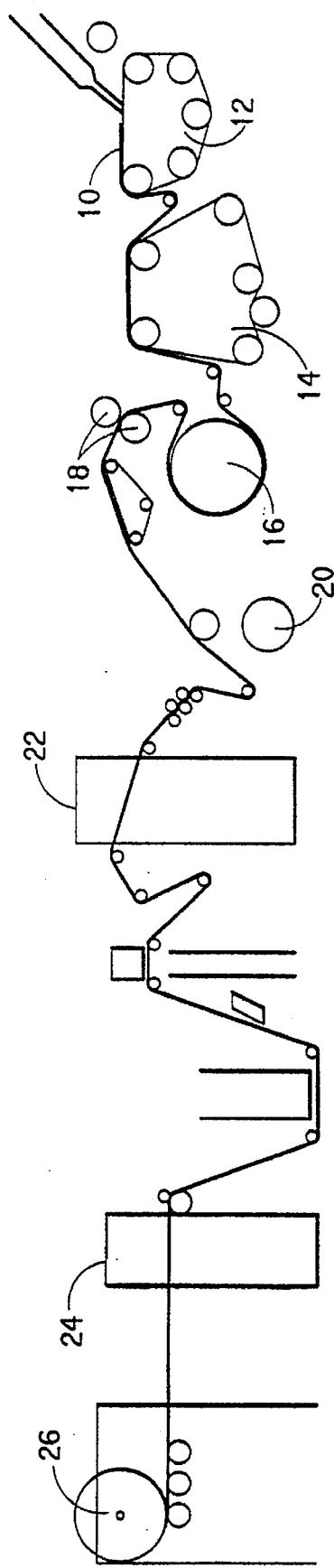
FIG. 1 is a schematic view of a continuous hydroentanglement process of the invention depicting belt and drum washers for water jetting both sides of a fabric web and a conventional squeeze roll for dewatering the resulting fabric following water jetting.

Referring now to the figures, wherein like reference numerals represent like elements, schematic representations are shown of two continuous processes of the invention. FIG. 1 depicts a continuous process wherein a web of fibers 10 (e.g., synthetic textile staple fibers and woodpulp and/or woodpulp-like fibers) is air-laid onto a conveyor 12 having a smooth mesh screen and conveyed towards a belt washer 14. The web is air-laid such that the synthetic textile staple fibers are supported by the smooth mesh screen and the woodpulp fibers are supported by the synthetic textile staple fibers. Belt washer 14 contains a series of banks of water jets which treat the woodpulp side of the fiber web and cause the woodpulp fibers to become entangled with the synthetic textile staple fibers. Thereafter, the hydroentangled web is passed underneath another series of banks of water jets while it is supported on an apertured patterning member of a drum washer 16 so that the other side of the web (i.e., the synthetic textile staple fiber side) can receive hydroentanglement treatment. Although it is not depicted in FIG. 1, the synthetic textile staple fiber side of the hydroentangled web can be supported by the apertured patterning member instead of the woodpulp side of the hydroentangled web. Subsequently, the resulting patterned spunlaced fabric is passed through a pair of squeeze rolls 18 to dewater the fabric. Thereafter, the patterned spunlaced fabric may be further treated by a padder 20, a dryer 22 and a slitter 24 before it is wound up on roll 26.

Figure 2:
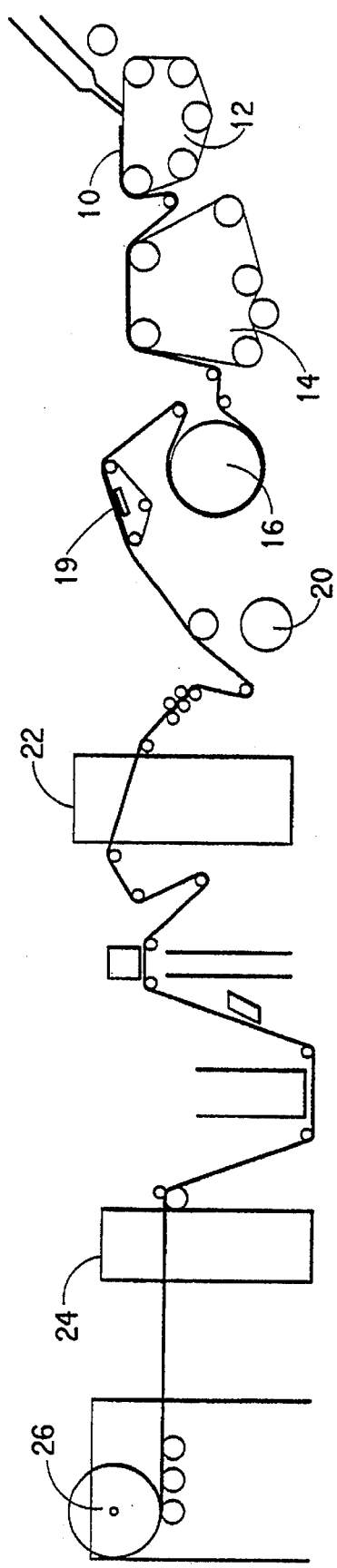
FIG. 2 is a schematic view of a preferred continuous hydroentanglement process of the invention depicting belt and drum washers for water jetting both sides of a fabric web and a vacuum dewatering extractor for improving the absorbency properties of the resulting fabric following water jetting.

FIG. 2 is identical to FIG. 1, except that the squeeze rolls 18 have been replaced by a vacuum dewatering extractor 19. Both of these dewatering techniques are useful in the invention, but as will be shown hereinafter, vacuum extraction provides patterned spunlaced fabrics which have improved absorbency properties over those spunlaced fabrics which have been squeeze rolled. The vacuum extractor 19 is positioned between the apertured patterning member of the drum washer 16 and the dryer 22.

As indicated above, the web is made up of a mixture of synthetic fibers and woodpulp fibers, woodpulp-like fibers or combinations thereof. The web should be formed so that there is a distinct layer of synthetic fibers and a distinct layer of woodpulp and/or woodpulp-like fibers (i.e., a woodpulp fiber side and a synthetic fiber side). Such webs may be produced by any conventional dry or wet method. Particularly preferred are the air-laid webs depicted in the Figures and produced according to U.S. Pat. No. 3,797,074 (Zafiroglu), the entire contents of which are incorporated by reference herein.

The woodpulp and/or woodpulp-like fibers used in preparing the web should be relatively short (i.e., on average less than about 7 mm), thin and flexible. (It will be understood that any reference to woodpulp fibers in this application is also a reference to any naturally occuring woodpulp-like fibers or combinations of both woodpulp fibers and woodpulp-like fibers). Specifically, woodpulp-like fibers include plant fibers of thin and flexible character that may not strictly be considered a part of the woodpulp family but can be easily formed into paper. Preferred woodpulp fibers include those obtained from northern softwoods, such as redwood, western red cedar or eastern white pine. Preferred woodpulp-like fibers include abaca fibers, fibers obtained from the leafstalk of a banana (Musa textilis) native to the Philippines and tropical regions of Ecquador. Abaca fibers are also often commonly referred to as "Manila hemp".

The amount of woodpulp and/or woodpulp-like fibers in the web may vary from about 5% to 50%, by weight, of the total weight of the final fabric, but preferably less than about 45% is used. Most preferably, the amount of woodpulp and/or woodpulp-like fibers present in the web is in the range of 15 to 45 wt. %. It is the applicant's belief that an untreated (i.e., no surface treatments or agents applied) woodpulp and/or woodpulp-like fiber content greater than 50 wt. % cannot be used to make an adequately low-linting spunlaced fabric, whether the fabric is patterned or not. Thus, woodpulp and/or woodpulp-like fiber contents greater than 50 wt. % are excluded from the applicant's invention.

The synthetic fibers may be of any suitable material such as polypropylene, polyamide, polyester, polyacrylonitrile resins or combinations thereof. Preferably, the length of such fibers is between 0.375 and 1 inch (0.95 to 2.54 cm), and the denier is between 0.7 and 5 d.p.f. (0.78 to 5.6 dtex). Of the above-listed materials, polyester is particularly preferred. The polyester may be in the form of textile staple fibers or as a spunbonded sheet.

The amount of synthetic fibers in the web may vary between 50% to about 95%, by weight, of the total weight of the final fabric, but preferably more than about 55% is used. Most preferably, the amount of synthetic fibers present in the web is in the range of 55 to 85 wt. %.

In use, the layered web is initially supported on a smooth foraminous screen (i.e., 75 mesh or finer) such that the synthetic fiber side is in contact with the screen. Thereafter, the woodpulp side of the web is traversed by high velocity streams of water jetted under relatively high pressure, e.g., from about 100 to 2000 psig, to hydraulically entangle the fibers of the woodpulp layer with the fibers of the synthetic layer. Thereafter, the hydroentangled web is supported on an apertured patterning member having from about 40 to about 10 openings per inch. Preferably, the woodpulp side of the hydroentangled web is supported on the apertured patterning member such that the resulting pattern predominantly appears on the woodpulp side of the spunlaced fabric. Then, the supported web (preferably the synthetic side of the hydroentangled web) is traversed by high velocity streams of water jetted under relatively high pressure to move the fibers laterally and vertically from their original positions toward the apertures of the patterning member to form a pattern on the resulting fabric. This pattern is determined by the apertures in the patterning member.

As used herein, "apertured patterning member" means any screen, perforated or grooved plate, or the like, on which the hydroentangled web of fibers is supported during processing and which by reason of its apertures and/or surface contours influences the movement of the fibers into a pattern in response to water jet streams. The patterning member may have a planar or nonplanar surface or a combination of planar and nonplanar areas. Greater detail regarding suitable patterning members is provided in U.S. Pat. No. 3,485,706 (Evans).

Various weaves and patterns may also be selected for the apertured patterning member according to the fabric pattern desired. For example, woven screens suitable for forming the fabrics of the invention are described in Widen, C. B., "Forming Wires for Hydroentanglement Systems", *Nonwovens Industry*, pp. 39–43 (1988). Perforated cylinders suitable for this invention are also disclosed in U.S. Pat. No. 4,704,112 (Suzuki et al.).

During fabric manufacture, the fibrous web is subjected to jets of water delivered through closely-spaced small orifices. The jets used in each of the process steps impart to the web a total impact-energy product ("I×E") of at least 2× Horsepower-hour-pounds force/pounds mass (HP-hr-lb/$lb_m$), preferably 2× to 10× Hp-hr-lb/$lb_m$, most preferably 2× to 5× Hp-hr-lb/$lb_m$, according to the general process of U.S. Pat. No. 3,485,706 (Evans), the entire contents of which are incorporated herein by reference. In addition, equipment of the general type described above, and mentioned in U.S. Pat. No. 3,485,706 (Evans) and U.S. Pat. No. 3,403,862 (Dworjanyn), is suitable for the water-jet treatment.

The energy-impact product delivered by the water jets impinging upon the fabric web is calculated from the following expressions, in which all units are listed in the "English" units from measurements orginally made or from units converted from measurements originally made (e.g., pounds per square inch converted to pounds per square foot) so that the "I×E" product is in foot-pounds force-pounds force per pounds mass. This expression can then be divided by $1.98 \times 10^6$ foot-pounds force per horsepower-hour to ultimately obtain an "I×E" product in horsepower-hour-pounds force per pounds mass.

$$I = PA$$

$$E = PQ/wzs$$

wherein:

I is impact in pounds force

E is jet energy in foot-pounds force per pound mass

P is water supply pressure in pounds per square foot

A is cross-sectional area of the jet in square feet

Q is volumetric water flow in cubic feet per minute w is web weight in pounds mass per square yard z is web width in yards and s is web speed in yards per minute Although the general process of hydrolacing a fabric web is not new, the spunlaced fabrics of the invention formed by water jetting and patterning woodpulp/synthetic fiber webs display unexpected and surprising physical properties and product features than those exhibited by prior art fabrics. These specific differences are set forth in the Tables below for fabrics of the invention and for fabrics of the prior art.

The following test procedures were employed to determine the various characteristics and properties reported below:

Dry particle count and wet particle count were determined by the test methods described in Kwok et al., "Characterization of Cleanroom Wipers: Particle Generation" Proceedings-*Institute of Environmental Sciences*, pp. 365–372 (1990) and "Wipers Used In Clean Rooms And Controlled Environments", *Institute of Environmental Sciences*, IES-RP-CC-004-87-T, pp. 1–13 (October, 1987). In brief, the spunlaced fabric is flexed in air on a Gelbo Flexer and the particles generated are measured with a laser counter as dry particle count. The wet particle count (i.e., number of particles suspended in water) is also measured with a laser counter after the fabric has been washed in water. Dry particle count is recorded as particles/$ft^3$ of air while wet particle count is recorded as particles/$m^2$ of fabric.

Absorbent characteristics were determined using a Gravametric Absorbency Testing System (GATS), available from M/K Systems, Danvers, Mass. In this test, a dry fabric specimen is placed onto a flat surface that is connected by a liquid bridge to a reservoir of water sitting on a top-loading balance. As liquid is taken up by the fabric, the amount transferred from the reservoir to the fabric is recorded as a loss in weight at the balance. The corresponding time interval from test initiation is likewise recorded automatically. The uptake rate is obtained from the rate of change of the balance reading. Typical fabrics absorb liquid most rapidly at the initiation of the test and more slowly as they reach their sorptive limit (absorptive capacity). The rate data reported herein is the rate of liquid uptake when the fabric has reached 50% of its total capacity (Rate @50% in g of water sorbed/g of fabric/sec). Total capacity is reported herein as the weight of liquid sorbed by the fabric, expressed as a percentage based on the sample weight.

The following non-limiting examples illustrate the differences in physical properties of the inventive patterned spunlaced woodpulp and/or woodpulp-like/synthetic fabrics compared to both patterned and non-patterned spunlaced fabrics of the prior art:

EXAMPLES

EXAMPLE 1

In this example, a patterned spunlaced woodpulp/polyester fabric was made with mixtures of western red cedar woodpulp and polyester textile staple fibers in the form of an air-laid web. Commercially available "Dacron" polyester staple fibers (Type T612) from E. I. du Pont de Nemours and Co., Wilmington, Del., having a denier of 1.35 (1.5 dtex) and a length of 0.85 inch (2.16 cm), were combined with western red cedar woodpulp fibers (commercially available in roll form from E. B. Eddy Paper Co. of Port Huron, Mich. having a fiber length less than about 0.12 inches (0.30 cm). The cedar woodpulp was used in roll form and had a weight of 20 lbs/3300 ft$^2$ ream. The polyester staple fibers were air-laid according to the process described in U.S. Pat. No. 3,797,074 (Zafiroglu) and combined with the woodpulp fibers to form a 1.68 oz/yd$^2$ (57.0 g/m$^2$) web (woodpulp fibers on top of the polyester fibers). Based on the weight of the web, the web had a measured woodpulp content of about 44 wt. % and a polyester content of about 56 wt.%.

In a continuous operation, the web was supported on a smooth foraminous screen (approximately 76 mesh) such that the polyester side of the web was in contact with the screen. Thereafter, the web was passed along at a belt washer speed of 169 yds/min (155 m/min) and then passed underneath a series of banks of belt washer jets under conditions as shown in Table I. The water used for the jets was once-through water that had not been recirculated. In a continuous operation, the web was wrapped around a drum washer having an apertured patterning member so that the back side of the web (i.e., the woodpulp side of the web) contacted the apertured patterning member) could be passed underneath a series of banks of drum washer jets under conditions as shown in Table II. It should be noted that the wind-up speed of the fabric was 185 yds/min (169 m/min) and this value was used, along with certain standardized process variables, to calculate the "I×E" product provided in the Tables below. The apertured patterning member had 24 wires per inch (i.e., 24 warp wires). Following patterning, the spunlaced fabric was dewatered using a pair of squeeze rolls.

TABLE I

Belt Washer Treatment

| Jet No. | Orifice Diameter inch (mm) | # of Jets per inch (cm) | Pressure psi | I × E Hp-hr-lb$_f$/lb$_m$ |
|---|---|---|---|---|
| 1 | 0.005(0.127) | 40(15.7) | 100 | 0.001 |
| 2 | 0.005(0.127) | 40(15.7) | 300 | 0.01 |
| 3 | 0.005(0.127) | 40(15.7) | 500 | 0.04 |
| 4 | 0.005(0.127) | 40(15.7) | 800 | 0.14 |
| 5 | 0.005(0.127) | 40(15.7) | 1400 | 0.56 |

TABLE I-continued

Belt Washer Treatment

| Jet No. | Orifice Diameter inch (mm) | # of Jets per inch (cm) | Pressure psi | I × E Hp-hr-lb$_f$/lb$_m$ |
|---|---|---|---|---|
| 6 | 0.005(0.127) | 40(15.7) | 1800 | 1.06 |
| 7 | 0.005(0.127) | 40(15.7) | 1800 | 1.06 |
| 8 | 0.005(0.127) | 40(15.7) | 1800 | 1.06 |
| 9 | 0.005(0.127) | 40(15.7) | 1800 | 1.06 |
| 10 | 0.005(0.127) | 60(23.5) | 300 | 0.02 |

Total I × E = 5.011 × Hp-hr-lb$_f$/lb$_m$

TABLE II

Drum Washer Treatment

| Jet No. | Orifice Diameter inch (mm) | # of Jets per inch (cm) | Pressure psi | I × E Hp-hr-lb$_f$/lb$_m$ |
|---|---|---|---|---|
| 1 | 0.005(0.127) | 40(15.7) | 300 | 0.01 |
| 2 | 0 | 0 | 0 | 0 |
| 3 | 0.005(0.127) | 40(15.7) | 1800 | 1.04 |
| 4 | 0 | 0 | 0 | 0 |
| 5 | 0.005(0.127) | 40(15.7) | 1800 | 1.04 |
| 6 | 0 | 0 | 0 | 0 |
| 7 | 0 | 0 | 0 | 0 |
| 8 | 0 | 0 | 0 | 0 |
| 9 | 0 | 0 | 0 | 0 |
| 10 | 0 | 0 | 0 | 0 |

Total I × E = 2.09 × Hp-hr-lb$_f$/lb$_m$

The inventive fabric was tested for dry particle generation using a Gelbo Flex Test Apparatus. The inventive fabric was also tested for wet particle generation using a Biaxial Shake Test using the test procedure described in IES-RP-CC-004-S87-T. The results of the wet and dry particle tests are tabulated below in Table III and are compared to results obtained for: (A) a non-patterned spunlaced 1.65 oz/yd$^2$ (55.9 g/m$^2$) cedar woodpulp/polyester (Cedar WP/PET) fabric; and (B) a non-patterned spunlaced 2.04 oz/yd$^2$ (69.1 g/m$^2$) pine woodpulp/polyester (Pine WP/PET) fabric. The pine WP/PET (eastern pine woodpulp and "Dacron" polyester) is commercially available as "Sontara" Style 8801 from E. I. du Pont de Nemours and Co., Wilmington, Del. The jet profile and pressures for the comparative samples were the same as for the inventive patterned spunlaced fabric, except that the drum washer was not used for making the non-patterned fabrics. Absorbency rates and capacities according to the GATS method described above are also provided for the inventive fabric, the non-patterned cedar WP/PET fabric and the non-patterned pine WP/PET fabric. Both the non-patterned cedar WP/PET and non-patterned pine WP/PET fabrics are currently recommended for use in wiper applications.

TABLE III

| Properties | Patterned Inventive Fabric | (A) Non-patterned Cedar WP/PET | (B) Non-patterned Pine WP/PET |
|---|---|---|---|
| Woodpulp Content (wt. %) | 44 | 48 | 56 |
| Particle counts (≧0.5 micrometers) | | | |
| Dry particles/ft$^3$ of air | 1600 | 5574 | 45,200 |

TABLE III-continued

| Properties | Patterned Inventive Fabric | (A) Non-patterned Cedar WP/ PET | (B) Non-patterned Pine WP/ PET |
|---|---|---|---|
| Wet particles/m² of fabric Absorbency | $4.6 \times 10^7$ | $8.4 \times 10^7$ | $1.01 \times 10^8$ |
| Rate @ 50% (g/g/sec) | 0.21 | 0.25 | 0.25 |
| Capacity (%) | 401 | 408 | 346 |

The fabrics of the invention generate surprisingly much lower particle counts than non-patterned cedar WP/PET fabrics and non-patterned pine WP/PET fabrics. In addition, comparative sample (B) exhibits much higher particle counts than does comparative sample (A) due to the increased woodpulp content in sample (B) (i.e., greater than 50 wt. %).

In Table IV, the physical properties of two additional prior art samples (comparative samples C and D) are reported for further purposes of comparison. These samples are of the 100% synthetic fiber type disclosed in the Evans patent. In Table IV, a 2.77 oz/yd² (94.2 g/m²) patterned spunlaced fabric sample of 100% polyester staple fibers was made and dewatered by vacuum extraction. In addition, a 1.97 oz/yd² (67.0 g/m²) non-patterned spunlaced fabric sample of 100% polyester staple fibers was made and dewatered by squeeze rollers. The results are as follows:

TABLE IV

| Properties | (C) Non-patterned 100% PET | (D) Patterned 100% PET |
|---|---|---|
| Dewatering Method | Squeeze Roll | Vacuum Extraction |
| Particle counts ($\geq 0.5$ micrometers) | | |
| Dry particles/ft³ of air | 914 | 907 |
| Wet particles/m² of fabric Absorbency | $4.0 \times 10^6$ | $4.1 \times 10^6$ |
| Rate @ 50% (g/g/sec) | 0 | 0 |
| Capacity (%) | 0 | 0 |

Table IV shows that although the particle count for 100% polyester staple fibers is very low there is no associated absorbency measured by the GATS test for up to 10 minutes. Woodpulp and/or woodpulp-like fibers as used in this invention are what provide the necessary absorbency in the applicant's fabrics.

EXAMPLE 2

In this example, an inventive fabric was made according to Example 1 except that the apertured patterning member had 13 openings per inch (13 warp wires) instead of 24 openings per inch. The resulting patterned spunlaced fabric exhibited a dry particle count of 600 particles/ft³, a wet particle count of $6.2 \times 10^7$ particles/m², an absorbency rate @50% of 0.17 g/g/sec and an absorbency capacity of 405%.

EXAMPLE 3

In this example, a 1.73 oz/yd² patterned spunlaced fabric of the invention was vacuum dewatered instead of squeezed rolled. The same blend of fibers as described in Example 1 was formed into a web using the conditions, equipment and air-lay process described in Example 1. The sample was dewatered with a vacuum dewatering extractor at 17 inches of mercury vacuum after passing the drum washer jets. The results are summarized in Table V below. The results show that vacuum dewatering clearly increases the absorbency properties of the patterned spunlaced fabric. Therefore, in order to optimize the absorbency properties of a low-linting patterned spunlaced fabric of the invention, vacuum extraction should take the place of squeeze rolls.

TABLE V

| | Example 1 (Squeeze roll) | Example 3 (Vacuum extractor) |
|---|---|---|
| Particle count ($\geq 0.5$ micrometers) | | |
| Dry particles/ft³ of air | 1600 | 1931 |
| Wet particle/m² of fabric Absorbency | $4.6 \times 10^7$ | $4.6 \times 10^7$ |
| Rate @ 50% (g/g/sec) | 0.21 | 1.16 |
| Capacity (%) | 401 | 934 |

EXAMPLE 4

In this example, two variants of a patterned three-layered spunlaced fabric were made by sandwiching a woodpulp fiber layer between two synthetic fiber layers.

In the first variant (4A), a "Reemay" spunbonded polyester fabric (commercially available from Reemay, Inc., Old Hickory, Tenn. as a 1.0 oz/yd² (34 g/m²) consolidated web (lightly bonded) of 2.2 dpf round continuous filaments, Style T503) was placed on top of layers of polyester staple fibers and woodpulp fibers, and the resultant three layered composite web (PET staple/woodpulp/"Reemay") was passed under the water jets of Example 1 (washer belt) such that the jets traverse the "Reemay" side of the composite web. The web is entangled from the "Reemay" side and then subsequently entangled from the PET staple side using the drum washer of Example 1. The drum washer used apertured patterning members having 24 wires per inch (i.e., 24 warp wires).

In the second variant (4B), the polyester staple layer (PET staple) was replaced with a "Reemay" spunbonded polyester fabric so that the resulting three layered composite was comprised of "Reemay"/woodpulp/"Reemay". The composite was treated and patterned the same as the first variant. Similar properties for the first and second variant were obtained as shown in Table VI.

TABLE VI

| Composites Utilizing Continuous Filament Scrims | | | |
|---|---|---|---|
| | Example 1 | Example 4A | Example 4B |
| Fabric | | | |
| Weight (oz/yd²) | 1.68 | 2.77 | 2.95 |
| Wt. % PET | 56 | 71 | 77 |
| Woodpulp (lbs/ | 20 | 20 | 20 |

TABLE VI-continued

Composites Utilizing Continuous Filament Scrims

|  | Example 1 | Example 4A | Example 4B |
|---|---|---|---|
| 3300 ft² ream) Particle Count (≧0.5 micrometers) | | | |
| Dry particles/ft³ of air | 1600 | 407 | 219 |
| Wet particles/m² of fabric Absorbency | 4.6 × 10⁷ | 3.3 × 10⁷ | 3.0 × 10⁷ |
| Rate @ 50% (g/g/sec) | 0.21 | 0.24 | 0.18 |
| Capacity (%) | 401 | 439 | 370 |

As can be seen from Table VI, the resulting variant spunlaced fabrics exhibit exceptional properties, particularly dry particles. The composite sandwich structure is believed to inhibit the release of dry particles upon flexing while retaining good absorptive properties. The improvement in dry particles is not believed to be due to a compositional increase in wt. % PET, since the woodpulp weight was the same per unit area for all three examples in Table VI. The tactile "hand" is also more similar to 100% polyester fabrics than typical WP/PET fabrics by virtue of polyester being exposed on each side.

EXAMPLE 5

In this example, abaca fibers (i.e., woodpulp-like fibers) were used in combination with softwood woodpulp fibers to make a patterned spunlaced fabric similar to that described in Example 1. In particular, 70 wt. % abaca fibers/30 wt. % softwood woodpulp fibers (commercially available in paper roll form from J. R. Crompton of Bury, England as type PV 221) were used without any wet strength resins added to the fibers. The abaca/woodpulp combination paper had a weight of 17.4 lbs/3300 ft² ream. The polyester staple fibers were air-laid according to the process described in U.S. Pat. No. 3,797,074 (Zafiroglu) and combined with the abaca/woodpulp fibers to form a 1.73 oz/yd² (58.6 gm/m²) web (abaca/woodpulp fibers on top of the polyester fibers). Based on the weight of the web, the web had a measured abaca/woodpulp content of about 38 wt. % and a polyester content of about 62 wt. %.

The belt washer jets were used to apply a total impact energy of 6.0× Hp-hr-lb$_f$/lb$_m$ and the drum washer jets were used to apply a total impact energy of 4.0× Hp-hr-lb$_f$/lb$_m$ (Total "I×E"=10.0× Hp-hr-lb$_f$/lb$_m$). The patterned spunlaced fabric was squeeze roll dewatered.

The inventive abaca-based fabric was tested for dry particle generation using a Gelbo Flex Test Apparatus. The inventive fabric was also tested for wet particle generation using a Biaxial Shake Test using the test procedure described in IES-RP-CC-004-87-T. The results of the wet and dry particle tests are tabulated below in Table VII. Absorbency rates and capacities according to the GATS method described above are also provided for the inventive fabric.

TABLE VI

| Properties | Patterned Abaca-Based Inventive Fabric |
|---|---|
| Abaca/Woodpulp Content (wt. %) Particle counts (≧0.5 micrometers) | 38 |
| Dry particles/ft³ of air | 848 |
| Wet particles/m² of fabric Absorbency | 2.3 × 10⁷ |
| Rate @ 50% (g/g/sec) | 0.153 |
| Capacity (%) | 477 |

The resulting abaca-based fabric had excellent low-linting properties and very good absorptive properties.

EXAMPLE 6

In this example, type PV 221 abaca/woodpulp combination paper from J. R. Crompton was again used. The paper did not have any wet strength resins added to the fibers. The abaca/woodpulp paper had a weight of 17.4 lbs/3300 ft² ream. The polyester staple fibers were air-laid according to the process described in U.S. Pat. No. 3,797,074 (Zafiroglu) and combined with the abaca/woodpulp fibers to form a 1.49 oz/yd² (50.5 g/m²) web (abaca/woodpulp fibers on top of the polyester fibers). Based on the weight of the web, the web had a measured abaca/woodpulp content of about 35 wt. % and a polyester content of about 65 wt. %.

The belt washer jets were used to apply a total impact energy of 22.0× Hp-hr-lb$_f$/lb$_m$ and the drum washer jets were used to apply a total impact energy of 23.0× Hp-hr-lb$_f$/lb$_m$ (Total "I×E"=45.0× Hp-hr-lb$_f$/lb$_m$). The resulting patterned spunlaced fabric was dewatered by vacuum extraction.

The inventive abaca-based fabric was tested for dry particle generation using a Gelbo Flex Test Apparatus. The inventive fabric was also tested for wet particle generation using a Biaxial Shake Test using the test procedure described in IES-RP-CC-004-87-T. The results of the wet and dry particle tests are tabulated below in Table VIII. Absorbency rates and capacities according to the GATS method described above are also provided for the inventive fabric.

TABLE VIII

| Properties | Patterned Abaca-Based Inventive Fabric |
|---|---|
| Abaca/Woodpulp Content (wt. %) Particle counts (≧0.5 micrometers) | 35 |
| Dry particles/ft³ of air | 2270 |
| Wet particles/m² of fabric Absorbency | 2.1 × 10⁷ |
| Rate @ 50% (g/g/sec) | 0.725 |
| Capacity (%) | 933 |

The resulting abaca-based fabric had excellent low-linting properties and very good absorptive properties.

EXAMPLE 7

In this example, a patterned three-layered spunlaced fabric was made by sandwiching an abaca/woodpulp fiber layer between two synthetic fiber layers, namely a polyester scrim layer and a polyester staple fiber layer.

Type PV 222 abaca/woodpulp paper from J. R. Crompton was used without any wet strength resins added to the fibers. The abaca/woodpulp combination paper had a weight of 22.0 lbs/3300 ft$^2$ ream. The abaca/woodpulp combination paper was sandwiched between a layer of polyester staple fibers, which were air-laid according to the process described in U.S. Pat. No. 3,797,074 (Zafiroglu), and a 1.0 oz/yd$^2$ polyester scrim ("Sontara" Style S8001 commercially available from E. I. du Pont de Nemours and Company of Wilmington, Del.). The resultant three-layered composite web (PET staple/abaca-based paper/PET scrim) was passed under belt washer water jets operating such that the jets traversed the polyester scrim side of the composite web and provided an "I×E" of 8.0× Hp-hr-lb$_f$/lb$_m$. The web was entangled from the polyester scrim side and then subsequently entangled from the polyester staple side using drum washer water operating jets such that the jets traverse the polyester staple side of the composite web and provided an "I×E" of 9.0× Hp-hr-lb$_f$/lb$_m$ (Total "I×E"=17.0× Hp-hr-lb$_f$/lb$_m$). The drum washers used apertured patterning members having 24 wires per inch (i.e., 24 warp wires). After patterning, the composite web was dewatered by vacuum extraction. The resulting composite web had a basis weight of 2.77 oz/yd$^2$ (93.8 g/m$^2$) and a measured polyester content of about 70 wt. % and an abaca/woodpulp content of about 30 wt. %.

The inventive abaca-based composite fabric was tested for dry particle generation using a Gelbo Flex Test Apparatus. The inventive fabric was also tested for wet particle generation using a Biaxial Shake Test using the test procedure described in IES-RP-CC-004-S7-T. The results of the wet and dry particle tests are tabulated below in Table IX. Absorbency rates and capacities according to the GATS method described above are also provided for the inventive fabric.

TABLE IX

Composite Utilizing Continuous Filament Scrim
PET Scrim/Abaca-Based Paper/PET Staple

| | |
|---|---|
| Abaca/Woodpulp Content (wt. %) Particle Count ($\geq$ 0.5 micrometers) | 30 |
| Dry particles/ft$^3$ of air | 48 |
| Wet particles/m$^2$ of fabric | 2.5 × 10$^7$ |

TABLE IX-continued

Composite Utilizing Continuous Filament Scrim
PET Scrim/Abaca-Based Paper/PET Staple

| Absorbency | |
|---|---|
| Rate @ 50% (g/g/sec) | 0.231 |
| Capacity (%) | 611 |

As can be seen from Table IX, the resulting three-layered spunlaced fabric exhibits exceptional properties, particularly dry particles. As noted before, the composite sandwich structure is believed to inhibit the release of dry particles upon flexing while retaining good absorptive properties. This embodiment utilizes many preferred features of the invention, features that tend to optimize particle counts and absorbency properties.

Although particular embodiments of the present invention have been described in the foregoing description, it will be understood by those skilled in the art that the invention is capable of numerous modifications, substitutions and rearrangements without departing from the spirit or essential attributes of the invention. Reference should be made to the appended claims, rather than to the foregoing specification, as indicating the scope of the invention.

I claim:

1. A patterned spunlaced fabric comprising a mixture of 50–95 wt. % synthetic fibers selected from the group consisting of polyester, polypropylene, polyamide, polyacrylonitrile resins and combinations thereof and 5–50 wt. % woodpulp or abaca fibers, said fabric having a pattern of apertures of between 10 and 40 openings per inch, dry particle count no greater than 8000 particles/ft$^3$, a wet particle count no greater that 6.5×10$^7$ particles/m$_2$, the absorbency rate is at least 0.1 g/g/sec and the absorbency capacity is at least 300%.

2. The patterned spunlaced fabric of claim 1 wherein the dry particle count is no greater than 5000 particles/ft$^3$, the wet particle count is no greater than 5.0×10$^7$ particles/m$^2$, the absorbency rate is at least 0.15 g/g/sec and the absorbency capacity is at least 350%.

3. The patterned spunlaced fabric of claim 1 wherein the synthetic fibers are present in an amount of from 55 to 85%, by weight, of the total weight of the fabric.

4. The patterned spunlaced fabric of claim 1 wherein the synthetic fibers take the form of textile staple fibers or spunbonded fibers.

5. The patterned spunlaced fabric of claim 1 wherein the woodpulp fibers are obtained from redwood, western red cedar or eastern white pine.

6. The patterned spunlaced fabric of claim 1 wherein the fabric comprises a cleanroom wipe, a robotic cover, a food service wiper or coverstock for sanitary napkins, diapers or surgical body part bags.

* * * * *